United States Patent [19]

Hart et al.

[11] 3,918,982
[45] Nov. 11, 1975

[54] BLACK CERAMIC BODY

[75] Inventors: Lewis Frederick Hart, Bridgewater; Robert Leroy Buttle, Sumit, both of N.J.

[73] Assignee: RCA Corporation, New York, N.Y.

[22] Filed: Oct. 2, 1974

[21] Appl. No.: 511,457

[52] U.S. Cl. ............ 106/46; 106/46 A; 106/DIG. 5; 106/66; 106/73.32
[51] Int. Cl.² ......................................... C04B 33/26
[58] Field of Search .... 106/46 A, DIG. 5, 66, 73.32

[56] References Cited
UNITED STATES PATENTS

| | | | |
|---|---|---|---|
| 2,369,266 | 2/1945 | Thurnauer | 106/66 |
| 3,291,619 | 12/1966 | Luks | 106/46 |
| 3,378,385 | 4/1968 | McCreight et al. | 106/66 |
| 3,776,744 | 12/1973 | Clendenen | 106/73.4 |
| 3,791,833 | 2/1974 | Sugiura et al. | 106/46 |

Primary Examiner—Helen M. McCarthy
Assistant Examiner—William G. Wright
Attorney, Agent, or Firm—Glenn H. Bruestle; Donald S. Cohen; Ronald L. Yin

[57] ABSTRACT

A ceramic body exhibiting black or near-black coloration and having good physical strength has been achieved for a body based on $Al_2O_3$, through the addition of $SiO_2$, $TiO_2$, and $Cr_2O_3$, and fired in a reducing atmosphere. Resistivity of the body can be varied as a function of the amount of $TiO_2$.

2 Claims, No Drawings

BLACK CERAMIC BODY

BACKGROUND TO INVENTION

This invention relates to a new ceramic body and in particular to a ceramic body characterized by black or near-black color which results when the body is fired in a reducing atmosphere.

The method of making ceramic bodies and in particular those bodies made from $Al_2O_3$ is fairly well known (See: U.S. Pat. No. 2,952,877). In certain applications, however, to prevent oxidation of refractory metals that are deposited on the surface of the ceramic body, the ceramic body is fired in a reducing atmosphere. Difficulty had been encountered in achieving a ceramic body exhibiting black or near-black coloration, fired in a reducing atmosphere. Such ceramic body is desired for use as background substrate for display devices as outlined in U.S. Pat. NO. 3,800,178. U.S. Pat. No. 3,291,619 discloses a method of making a ceramic body, exhibiting black or near-black coloration.

SUMMARY OF INVENTION

A fired ceramic body, exhibiting black or near-black coloration and having good physical strength, is obtained by firing the ceramic body, comprising by weight between about 65 and 96% $Al_2O_3$, between about 1 and 10% $SiO_2$, between about 1 and 5% $TiO_2$, and between about 2 and 12% $Cr_2O_3$, in a reducing atmosphere.

DETAILED DESCRIPTION OF INVENTION

The ceramic body of this invention is made from a mixture of $Al_2O_3$, $SiO_2$, $TiO_2$ and $Cr_2O_3$. The body can comprise by weight between about 65 and 96% $Al_2O_3$, between about 1 and 10% $SiO_2$, between about 1 and 5% $TiO_2$, and between about 2 and 12% $Cr_2O_3$. Commercially available sources may also be substituted for some of the compounds. Thus, $Al_2O_3$ may also be added in part from clay and $SiO_2$ may be added in part from talc or also in part from clay.

The compounds are ground in a ball mill to fineness of about 5 to 7 microns. The degree of fineness to which the compounds are ground will vary the temperature at which the body will be fired. Solvents, such as trichloroethylene, perchloroethylene, and butanol-1 (all of which are comercially avialable), along with commercially available resin and plasticizer are added to aid in shaping the body. The method of shaping the body can be pressing, extrusion, molding, doctor blading or other conventional means.

Firing is carried out in a reducing atmosphere. For a fineness of about 5 to 7 microns, a temperature range between about 1580°C. and 1620°C. is used. The reducing atmosphere is comprised of between about 10 and 30% $H_2$ and the rest $N_2$.

The exact chemical composition of the fire body is not known because it is believed that a chemical reaction transpired when the body is fired in a reducing atmosphere. In particular, it is believed, that part of this chemical reaction was the reduction of $TiO_2$ to $TiO$.

The invention will be described with reference to the following specific example which is given for purpose of illustration only and is not to be taken as in any way restricting the invention beyond the scope of the appended claims.

A mixture consisting of 3.6 parts of ball clay, 5.4 parts of talc, 7.8 parts of $Cr_2O_3$, 1.8 parts of $TiO_2$, and 81.4 parts of $Al_2O_3$ was made by weight. The resultant mixture had by weight a chemical composition of 83.15% $Al_2O_3$, 5.36% $SiO_2$, 7.84% $Cr_2O_3$, 1.87% $TiO_2$, 1.73% MgO, the traces of $Fe_2O_3$. The ingredients MgO and $Fe_2O_3$ were introduced from the talc and the ball clay and to one who is ordinarily skilled in the arts, these ingredients have no appreciable affect on the resultant color of the body.

The mixture was ground to a fineness of about 5 to 7 microns. Trichloroethylene, perchloroethylene and butanol-1 were added as solvents along with butvar (resin) and flexol 3 GH (plasticizer). The body was shaped by the doctor blading method.

Firing was carried out at 1600°C. for about 40 minutes in a reducing atmosphere of 10% $H_2$ and 90% $N_2$. The body was brought to this temperature at a rate of about 20°C./minute and then cooled at a rate of about 10°C./minute. The fired body was found to have a black or near-black color with good physical strength and a resistivity of the order of about $10^6$ ohms, which could be varied as a function of the amout of $TiO_2$.

The color of the body is particularly striking and surprising, since a fired body with $Cr_2O_3$, but without $TiO_2$, results in a rose color; a fired body with $TiO_2$, but without $Cr_2O_3$, results in a bluish gray color. The combination of the two compounds results in a black or near-black color. Although the exact mechanism by which the fired body attains its color is not known, it is believed that part of the mechanism is the reduction of $TiO_2$ to $TiO$.

What is claimed is:

1. A ceramic body, exhibiting black or near-black coloration and having good physical strength, after being fired in a reducing atmsophere and
consisting essentially of by weight 65 to 96% $Al_2O_3$, 1 to 10% $SiO_2$, 1 to 5% $TiO_2$ and 2 to 12% $Cr_2O_3$.
2. A ceramic body in accordance with claim 1 in which said body consists essentially of by weight 83.15% $Al_2O_3$, 5.36% $SiO_2$, 1.87% $TiO_2$ and 7.84% $Cr_2O_3$.

* * * * *